Nov. 6, 1934.  W. B. ROOD  1,979,575
TIRE BAND
Filed April 6, 1931
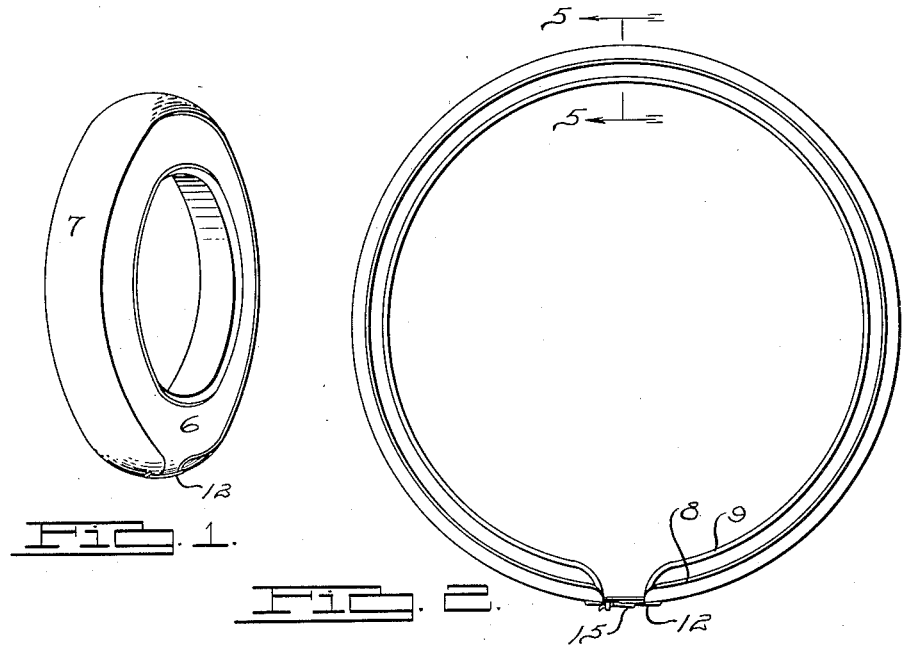
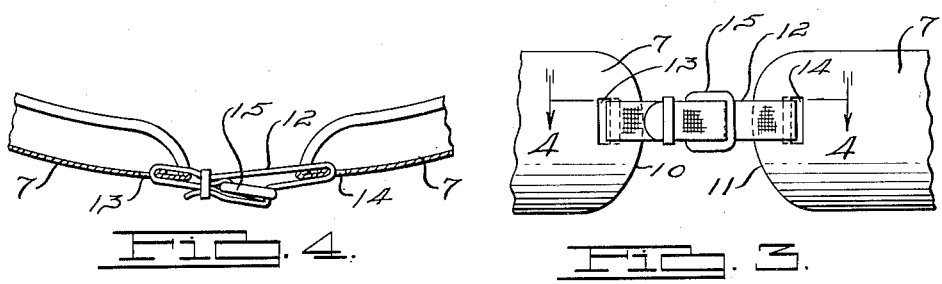
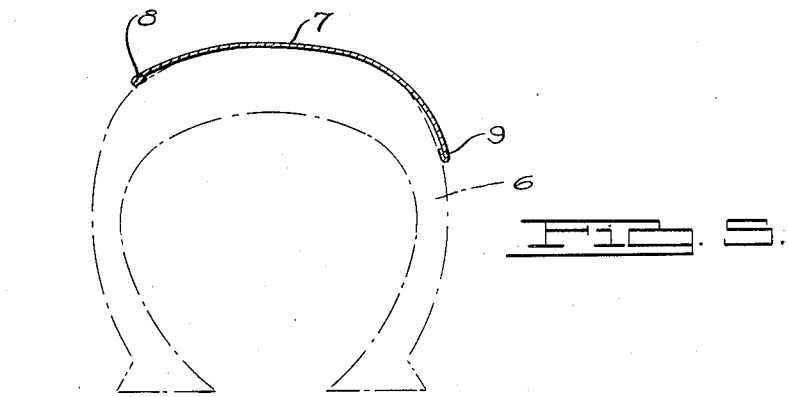
INVENTOR
Warren B. Rood.
BY
Harness, Dickey, Pierce & Hans
ATTORNEYS.

Patented Nov. 6, 1934

1,979,575

UNITED STATES PATENT OFFICE 1,979,575

TIRE BAND

Warren B. Rood, Detroit, Mich., assignor to Herron-Zimmers Moulding Company, a corporation of Illinois Application April 6, 1931, Serial No. 528,185

2 Claims. (Cl. 150—54)

My invention relates to a construction of tire band which is useful for the purpose of ornamentation as well as for the purpose of lending protection to a tire which is being carried as a spare.

Among the objects of my invention is to provide such a band which will be relatively easy of assembly to the tire and which may be used on tires within certain variations of sizes. Another object is to provide such a band which will require the use of a relatively small amount of material and will, therefore, be relatively inexpensive.

With the above and other objects in view, my invention consists in the arrangement, combination and construction of the various parts of my improved device as disclosed in the specification and shown in the accompanying drawing, in which:

Fig. 1 is a perspective view of a tire showing my improved band assembled thereon.

Fig. 2 is an elevation of my improved band.

Fig. 3 is a bottom view, looking upward as shown by the arrow in Fig. 2.

Fig. 4 is a sectional view taken on the line 4—4 of Fig. 3.

Fig. 5 is a sectional view taken on line 5—5 of Fig. 2.

I have shown the conventional tire 6 on which my improved band may be assembled. As will be readily seen, the band 7 is irregularly curved in cross section so as to fit over the crest of the tire and the portion of at least one side thereof. Preferably, one edge of the band, such as 8, terminates short of the point of greatest width of the tire while the other edge 9 covers a portion of the side wall of the tire and terminates at approximately the point of greatest width of the tire cross section. The circumferential extent of the band 7 is such that the ends 10 and 11 thereof will be spaced when the band is assembled to the tire and a strap 12 of fabric or other suitable material is threaded through the openings 13 and 14 for the purpose of drawing the band snugly about the tire. A buckle or other suitable device 15 may be utilized for securing the ends of the strap together when the band has been drawn about the tire.

It will readily be seen that the spacing of the ends 10 and 11 of the band permits of adjustment of the band around varying sized tires and that the cross sectional dimensions of the band are such that it can be readily assembled to tires of varying cross sectional dimensions. If the tire is of slightly smaller cross section dimension than the one disclosed in the drawing a larger surface of the tire will be covered by the band, while if the tire is larger than the one illustrated, a smaller proportion thereof will be covered by the band. It will be understood, of course, that the band will possess sufficient resiliency to lend itself to the slight variations. The important considerations are that the band shall be smaller in circumferential extent than the circumference of the tire and that its cross sectional dimensions shall be such that one edge of the band falls short of the point of greatest thickness of the tire, while the other edge ends at approximately the points of greatest thickness.

One important feature of my invention is that my improved band may be formed of a single continuous strip which need not be hinged intermediate its ends and which can be assembled to the tire without excessive deformation of either the tire or the band.

It will be obvious that various changes can be made in the arrangement, combination and construction of the various parts of my improved device without departing from the spirit of my invention and it is my intention to cover by my claims such changes as may be reasonably included within the scope thereof.

What I claim is:

1. A tire band comprising a single strip of material shaped to extend a greater distance on one side of the tire than on the other and provided with spaced ends which are provided with apertures, the metal from which is flanged over to form a smooth surface, and a strap extending between said band over said smooth surface to draw the band into engagement with the tire surface.

2. A tire band comprising a single strip of material having spaced ends provided with apertures, the metal from which is flanged over to form a smooth surface, and a strap extending between said band over said smooth surface to draw the band into engagement with the tire surface.

WARREN B. ROOD.